Aug. 19, 1941. W. K. TOMLINSON 2,253,465
SAUSAGE STUFFING APPARATUS
Filed Dec. 3, 1938
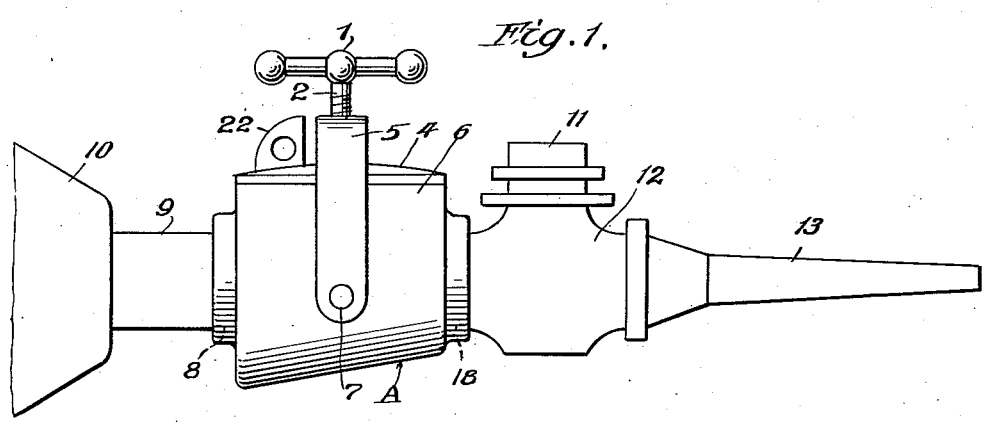
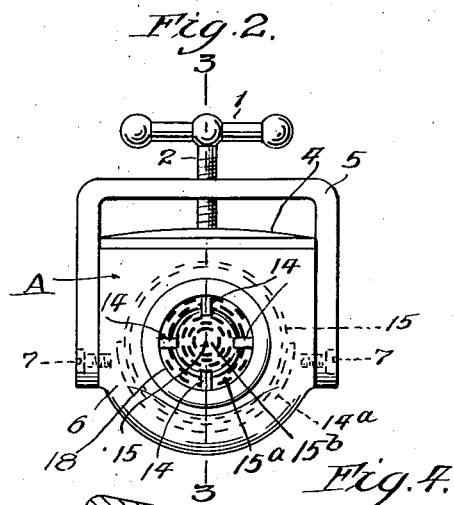
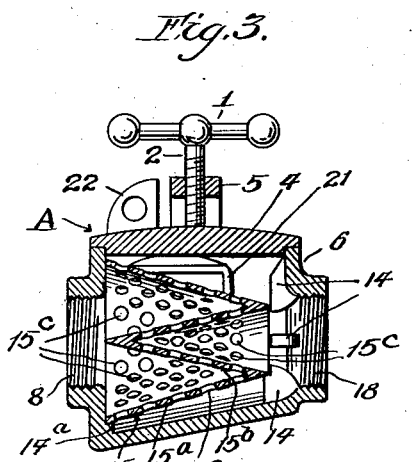
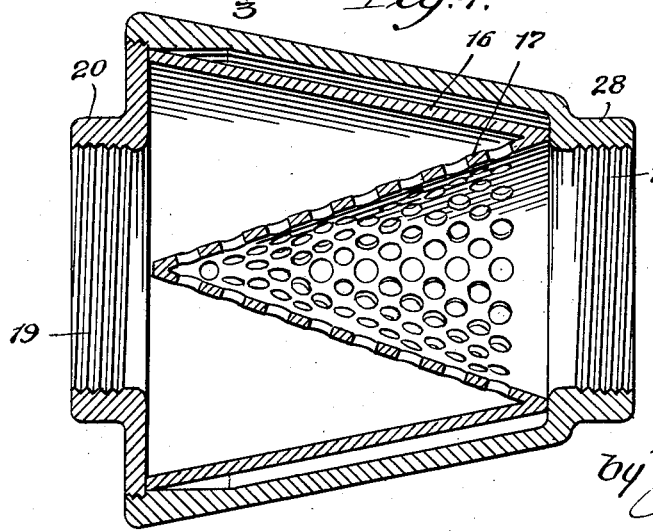
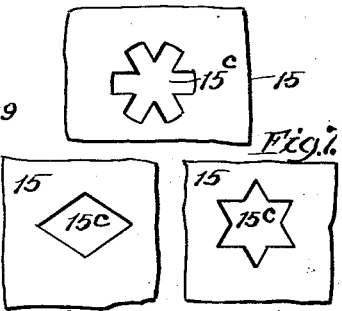
Inventor:
William Kent Tomlinson,
by Charles O. Survey,
his Atty.

Patented Aug. 19, 1941

2,253,465

UNITED STATES PATENT OFFICE 2,253,465

SAUSAGE STUFFING APPARATUS

William Kent Tomlinson, Chicago, Ill., assignor to The Globe Company, Chicago, Ill., a corporation of Illinois Application December 3, 1938, Serial No. 243,702

4 Claims. (Cl. 17—35)

This invention relates to sausage stuffing apparatus, and particularly to sausage stuffer elements which separate from sausage stuffing, prior to the forcing of said sausage stuffing into sausage casings, certain undesirable material and foreign matter.

This invention has for its aims and objects the following:

To provide a separating, screening or straining element for sausage stuffers which will separate from sausage stuffing, impurities and foreign ingredients intermixed therein, without materially reducing the rate of operation of the sausage stuffer.

To provide a separating element in the form of an attachment of a construction as will permit quick removal of said screening element therefrom for the purpose of changing and cleaning it.

To provide a separator attachment for sausage stuffers, the screening element of said attachment being adapted for quick changing to function on a plurality of types and textures of sausage stuffing.

In quantity production, sausage stuffing ingredients are mixed and intermixed and then, by means of a sausage stuffer, forced into sausage casings to form sausages. Such stuffing contains pieces of bone, gristle, muscular tissue, blood vessels and other foreign material which is undesirable in sausage stuffing and which it is desired to remove therefrom.

When separators of other arts are applied to sausage stuffing, it has been found such separators cause the temperature of said stuffing to rise, resulting in the partial cooking of the stuffing and the melting of the fatty substances and particles contained therein. The effect of the aforesaid rise of temperature is such as to cause the bacteria count of the said stuffing to rise and cause, also, the deterioration of said stuffing as to texture, taste and appearance.

It has been found that separators of other arts, when used as sausage stuffing separators, substantially impede the flow of sausage stuffing in sausage stuffers and greatly reduce the production of sausages from such apparatus. Separators, combined with rotating cutters, have been used in the prior art in small home sausage stuffers, but the application of the aforesaid prior art separators to quantity production sausage stuffers has proven impracticable and unsatisfactory for the reasons mentioned.

The invention consists, accordingly, in the hereinafter described features of construction and arrangement of parts which will be exemplified, by way of example only, in the construction hereinafter set forth and the scope of the application of which will be indicated in the appended claims.

In the accompanying drawing, forming a part of this specification:

Fig. 1 is a side elevation of one embodiment of the separating element in position on a sausage stuffer;

Fig. 2 is an end elevation of the outlet end of the separating element;

Fig. 3 is a longitudinal section taken along the line 3—3 of Fig. 2;

Fig. 4 is a longitudinal section of a modification of the invention;

Figs. 5, 6 and 7 are various types of perforations used in the screen or strainer of the separating element.

Referring to said drawing, which is merely illustrative of embodiments of the invention, the reference character 10 (Fig. 1) designates a fragment of the container or tank of a sausage stuffer of conventional form, usually comprising the container for the sausage stuffing and a floating plunger (not shown) which is forced toward the discharge end of the container, usually by air under pressure, whereby to discharge the contents through an outlet fitting 9 and through a valve controlled stuffing element or nozzle 13. In the present embodiment of the invention the separating element A is interposed between the discharge opening of the container and the valve controlled stuffing element or nozzle 13. Preferably the separating element comprises a casing 6 having an inlet port 8 and an outlet port 18, and a cover 4 closing an opening in the top of the casing. The outlet fitting 9 is connected to the casing at the inlet port 8 and a valve 12 is connected to the casing at the outlet port 18.

In operation the sausage stuffing is forced from the container of the sausage stuffer 10 through outlet fitting 9 and into the casing 6 through the inlet port 8.

A screening or straining element 15 (see Fig. 3) is positioned in the casing by engagement with shouldered lugs or retaining elements 14 within said casing 6 and by engagement with an end wall of said casing 6 and a shoulder 14a thereon.

The screening or straining element 15 is insertable and removable through the opening in the top of the casing whenever the cover is removed, and it may be provided with a handle 21 to facilitate its removal or replacement. The handle may engage with the under side of the cover 4 whereby it is held down in engagement with the shoulders on the end wall and lugs in alignment with the inlet and outlet ports of the casing.

The screening or separating element is formed with an abnormally large screening area whereby not to impede, to any substantial degree, the passage of the screened material through the screening or separating element, thereby preventing the sausage stuffing from being heated considerably which results in a partial cooking of the stuffing and the melting of the fatty substances and particles contained therein. Furthermore, by offering a minimum of resistance to the passage of the stuffing, the bacteria count of the stuffing is kept down and any deterioration of the stuffing as to texture, taste and appearance is prevented.

For obtaining a screening wall of large screening area the wall is preferably composed of an outer perforated wall section 15$^a$ and an inner perforated wall section 15$^b$ joined thereto at one end. Desirably, the outer section 15$^a$ is made of frusto-conical form, of which the larger diameter is placed at the wall containing the inlet port 8 and the inner section 15$^b$ is made of conical form with its apex disposed adjacent the inlet port and its base joined to the small end of the outer section 15$^a$. The walls of the screening element are formed with a large number of perforations 16$^c$ of suitable size and shape best adapted for intercepting foreign matter such as pieces of bone, gristle, veins and other stringy material. The perforations may be round or in the form of slots or other desirable shapes. Fig. 5 illustrates a type of perforation in which pointed tongues are formed on the edge of the perforation. In Fig. 6 a diamond shaped perforation is illustrated and in Fig. 7 a star shaped perforation is shown.

The sausage stuffing is forced through the perforations in the screen 15 and through the outlet 18 into a stuffing element or nozzle 13 through a controlling valve 12. 11 designates the stem of the valve. Sausage casings mounted over element 13 are filled by the sausage stuffing which is forced through the separating element as aforesaid.

The cover 4 (see Figs. 2 and 3) is fitted tightly into the opening in the upper side of casing 6 and is held in place therein by engagement with a screw 2 which projects through a swinging bracket 5. A hand wheel 1 is affixed to said screw to facilitate the turning of said screw. The bracket 5 is pivotally secured to casing 6 by pins 7 on either side of the casing 6. A handle 22 mounted on the cover 4 permits the easy removal of cover from its position over the opening in the casing 6.

In Fig. 4 is shown a modification of my invention in which is used a frusto-conical shaped member 16 having imperforate sides and an inwardly extending conical screen 17 closing one end thereof. Said screen 17 may be perforated with various shaped perforations, some of which are shown in Figs. 5, 6 and 7. It is found that the shapes illustrated are very effective in removing certain muscular tissue and blood vessels from sausage stuffing.

Also in Fig. 4 is shown a removable closure or fitting 20 which may be removed from casing 28 to permit removal therefrom of the screen for cleaning or changing it.

The closure or fitting 20 has an inlet port 19 and the casing 28 has an outlet port 29, the screen 17 being interposed between the two parts.

When sausage stuffings of different textures are forced through the separating element, screens are used that have perforations of a size and shape designed to separate foreign materials from sausage stuffings of such textures. I have found my attachment, while in the performance of its function, does not cause the heating of the sausage stuffing and its consequent deterioration as aforementioned.

When stuffing sausage casings in accordance with the present method, the sausage stuffing is forced from the container of the sausage stuffer through the separating element and nozzle into a sausage casing which has been slipped over the nozzle. While passing through the separating element, the pieces of bone, gristle, veins and other stringy material are intercepted and because of the great multiplicity of apertures in the screen, the wholesome material is permitted to pass freely through the screen, does not heat and consequently does not cause any of the objectionable results above mentioned.

Other changes and alterations may be made in the constructions and arrangements shown without departing from the spirit and scope of the invention, since the invention is not limited to the particular constructions illustrated.

I claim as new and desire to secure by Letters Patent:

1. In a sausage casing stuffer of the type described, the combination of a casing having inlet and outlet openings in the walls thereof, a perforate frusto-conical screening element, the smaller end of said screening element being closed with an inwardly extending, conical, perforate element, a handle affixed to said screening element, a removable element fitted to an opening in said casing whereby said screening member may be removed from within said casing, and means for positioning said removable element within the aforesaid opening in said casing.

2. In a sausage casing stuffer, the combination of a casing having inlet and outlet openings in opposite walls thereof, a screening member therein comprising a hollow frusto-conical screen element, the smaller end of which is closed by a conical, perforated, hollow screen element which extends into the hollow of the frusto-conical screen element, a removable closure fitted to an opening in said casing whereby said screening member may be removed from within the casing, and means for positioning said screening member in the casing between the inlet and outlet openings.

3. In a sausage casing stuffer, the combination of a casing having inlet and outlet openings in opposite walls thereof, a screening member comprising an annular perforated screen element abutting against the casing wall containing the inlet opening, and spaced away from the other walls thereof, and a hollow, conical perforated screen element extending into the hollow of the first mentioned screen element from the end thereof disposed adjacent the outlet opening of the casing, means to space the screening member from the casing wall containing the outlet opening, said casing having an opening through which the screening member may be withdrawn from within the casing, and a closure for said last mentioned opening.

4. In a sausage casing stuffer, the combination of a casing having inlet and outlet openings in opposite walls thereof, said casing having radially extending spacing lugs projecting into the interior of the casing from the casing wall containing the outlet opening, a screening member comprising a hollow perforated frusto-conical screen element, the smaller end of which is closed by a hollow perforated conical screen element which extends into the hollow of the frusto-conical screening element, said screening member being aligned with the inlet and outlet openings with the smaller end of the frusto-conical screen element spaced by said lugs from the casing wall which contains the outlet opening, said casing having an opening through which the screening member may be removed from within the casing, and a cover for said last mentioned opening operating to position the screening member in the casing.

WILLIAM KENT TOMLINSON.